United States Patent [19]

Foti

[11] Patent Number: 5,784,442
[45] Date of Patent: Jul. 21, 1998

[54] SYSTEM AND METHOD FOR REAL-TIME BILLING IN A RADIO TELECOMMUNICATIONS NETWORK

[75] Inventor: George Foti, Dollard des Ormeaux, Canada

[73] Assignee: Telefonaktiebologet LM Ericsson (publ), Stockholm, Sweden

[21] Appl. No.: 596,005

[22] Filed: Feb. 2, 1996

[51] Int. Cl.$^6$ .................................................. H04M 15/00
[52] U.S. Cl. .......................... 379/114; 379/58; 379/59; 379/112; 379/114; 379/115
[58] Field of Search .................. 379/58, 59, 112, 379/114–115, 119, 121

[56] References Cited

U.S. PATENT DOCUMENTS

| 4,751,728 | 6/1988 | Treat | 379/113 |
|---|---|---|---|
| 5,134,651 | 7/1992 | Ortiz et al. | 379/112 |
| 5,233,642 | 8/1993 | Renton | 379/59 |
| 5,291,543 | 3/1994 | Freese et al. | 379/59 |
| 5,295,180 | 3/1994 | Vendetti et al. | 379/59 |
| 5,297,189 | 3/1994 | Chabernaud | 379/58 |
| 5,303,297 | 4/1994 | Hillis | 379/58 |
| 5,321,735 | 6/1994 | Breeden et al. | 379/58 |
| 5,361,297 | 11/1994 | Ortiz et al. | 379/130 |
| 5,579,375 | 11/1996 | Ginter | 379/59 |

*Primary Examiner*—Curtis Kuntz
*Assistant Examiner*—Duc Nguyen
*Attorney, Agent, or Firm*—Steven W. Smith

[57] ABSTRACT

A system and method for providing real-time billing (RTB) information to mobile subscribers operating mobile stations in a radio telecommunications network and involved in a call in which at least one of the mobile subscribers is a RTB subscriber. The system is implemented entirely within the network and without modifying the mobile stations. The system comprises a plurality of mobile switching centers (MSCs), which collect toll ticketing (TT) records associated with calls processed by each MSC and associate the collected TT records with individual calls by the use of billing identification numbers. Each MSC tags TT records that are associated with real-time billing calls, and sends the tagged records to a local post processing unit for immediate processing. Real-time billing information is computed and electronically transmitted to RTB subscribers immediately after the completion of the call. Intersystem calls between MSCs, and call transfers between MSCs, require modification of specified IS-41 intersystem signaling messages and, in some cases, the use of a new IS-41 Immediate Billing Call message.

11 Claims, 5 Drawing Sheets

SYSTEM AND METHOD FOR REAL-TIME BILLING IN A RADIO TELECOMMUNICATIONS NETWORK

BACKGROUND OF THE INVENTION

1. Technical Field of the Invention

This invention relates to radio telecommunication systems and, more particularly, to a system and method of immediately itemizing calls and providing subscribers with billing information in real time.

2. Description of Related Art

In existing wireline telecommunication systems, there is a service known as Immediate Call Itemization (ICI) which enables the generation of billing information immediately after the completion of a call from a standard wireline telephone. However, there is no way for a mobile subscriber to immediately obtain call billing information.

In existing radio telecommunications networks, billing information is not immediately available to subscribers. Typically, a call may span several mobile switching centers (MSCs), and toll ticketing (TT) records are generated in each MSC which participated in processing the call. Once the call is completed, the TT records from each MSC are stored on a hard disk memory device for that MSC. Once a day, or once a week, whatever an operator's practice may be, the TT records are backed up on magnetic tape. In addition, the TT records are transferred via an X.25 port in the MSC to an external billing center for post processing. The external billing center may belong to a particular operator and may process only that operator's TT records, or the center may process records from several operators. Operators who have their own post-processing facilities generally transfer their TT record files via a dedicated link from the MSC to their local post-processing facility. Once in the billing center, the TT records are processed and billing information is generated and sent to the respective operators. The billing information is then utilized to settle accounts between operators for automatic roaming services and to bill individual subscribers.

This existing billing process is not performed in real time, and may typically be performed over several hours or several days. However, in several mobile telephone applications there is a need to have real-time billing information available at call termination. For example, car rental agencies or hotels that rent mobile telephones to their customers need to know the actual telephone charges accrued by a customer when the customer returns the telephone, so that the customer can be properly billed for the rental. This real-time billing information must be available regardless of whether the rented telephone originated the calls, received the calls, or received a transferred call since some charges may accrue to different parties, depending upon the call scenario.

A proposed system for telephone rental agencies utilizes a mobile telephone that has been modified with an internal memory device. The telephone stores in the internal memory device, the phone numbers called, the time of day of each call, and the length of each call made by the subscriber renting the mobile phone. Upon returning the phone to the rental agency, the phone is placed in a recepticle where the internal memory device is downloaded to an on-site computer. The computer is programmed with average cellular calling rates for the local area, and it estimates the charges for the telephone calls made by the renting subscriber. The rental agency can then collect the amount of the estimated charges and utilize that money to pay the actual telephone bill when the agency later receives it from the network operator.

This proposed system has several disadvantages. First, the system requires modification of the mobile telephone to install the internal memory device. Second, the system only records call originations, and therefore fails to capture charges that may accrue due to receiving calls or receiving call transfers. Third, the system requires the rental agency to purchase a recepticle compatible with the telephone and capable of downloading the internal memory device. Fourth, the rental agency must purchase an on-site computer to accept the downloaded information and to estimate the associated charges. Fifth, the system only estimates charges based upon the local rates that are programmed into the on-site computer. Therefore, the system is only capable of computing charges for calls from the local area. This restricts the mobility of the renting subscriber since he cannot roam into other exchanges. Finally, the rental agency must ensure that these rates are updated on a regular basis.

Although there are no known prior art teachings of a solution to the aforementioned deficiency and shortcoming such as that disclosed herein several references discuss subject matter that bears some relation to matters discussed herein. U.S. Pat. No. 5,134,651 to Ortiz et al. (Ortiz) discloses an autonomous pay telephone system that may utilize a mobile telephone. Like the proposed system discussed above, Ortiz suffers from several disadvantages. Ortiz utilizes a memory device to record calls originated from the mobile telephone, and utilizes a local computer to calculate charges based upon stored telephone rates. Ortiz, therefore, only records call originations, and fails to capture charges that may accrue due to receiving calls or receiving call transfers. Ortiz also requires the purchase of an on-site computer to accept the call information and to estimate the associated charges. Ortiz only estimates charges based upon rates that are programmed into the on-site computer, and the programmed rates must be updated on a regular basis. Actual charges are not accessed. Finally, the mobility of the subscriber is limited to the local exchange since it is not practical to program into the on-site computer, rates for every exchange into which the subscriber might roam.

U.S. Pat. No. 5,233,642 to Renton (Renton) discloses a cellular telephone usage monitoring system. Renton utilizes a memory device connected to a mobile telephone to store call detail record information. In other respects, Renton is similar to Ortiz and the proposed system above. As calls are made on a rented telephone, the call detail information is stored in the connected memory device. When the telephone is returned, a communications interface is utilized to transfer the stored information to a stationary unit containing a computer and an evaluation program which estimates the charges.

Renton suffers from the same disadvantages as Ortiz and the proposed system above. Renton requires modification of the mobile telephone to install or interface with the mobile memory device. Second, Renton only records call originations, and therefore fails to capture charges that may accrue due to receiving calls or receiving call transfers. Third, Renton requires a communications interface to download the mobile memory device into the stationary computer. Fourth, the evaluation program only estimates charges based upon rates that are programmed into the computer, and the programmed rates must be updated on a regular basis. Actual charges are not accessed. Finally, the mobility of the subscriber is limited to the local exchange since it is not practical to program into the stationary computer, rates for every exchange into which the subscriber might roam.

U.S. Pat. No. 5,291,543 to Freese et al. (Freese) discloses a cellular telephone call administration system that processes detailed call records from a cellular switch (i.e., MSC) as the calls are processed. The system utilizes a plurality of processors and a file server to electronically collect call records from the MSC as those calls are processed, and to distribute the collected call records to operators and resellers of cellular air time. Freese provides for registration of roaming mobile stations for service by the MSC without the need for a billing agreement with the mobile subscriber's home carrier.

Freese's call administration system, however, is designed for operation with a single MSC. The only roamers which Freese handles are roamers coming into the MSC in which the Freese call administration system is installed. Freese does to address how such a system would handle local subscribers who roam into foreign exchanges. Freese does not teach or suggest a real-time billing system that utilizes intersystem signaling messages to track a call through a plurality of MSCs, and immediately provide toll ticketing records for one or more mobile subscribers involved in the call.

Finally, U.S. Pat. No. 5,297,189 to Chabernaud (Chabernaud) discloses a method of providing access to subscription data in a wireless telephone service network. Chabernaud connects fixed stations in the wireless network (i.e., the Public Land Mobile Network (PLMN)) to central offices (COs) in the wireline Public Switched Telephone Network (PSTN). Call ticket information from wireless telephone calls is then passed through the COs to service control points (SCPs) in an intelligent network (IN) where the information is stored. Special subscriber terminals, modified with smartcard readers, can then access the stored information through a subscriber management system.

Chabernaud, however, does not teach or suggest a real-time billing system that utilizes intersystem signaling messages to track a call through a plurality of MSCs, and immediately provide toll ticketing records for one or more mobile subscribers involved in the call. Furthermore, Chabernaud must access the PSTN and an IN in order to store and retrieve the call ticket information. Chabernaud does not teach or suggest a method of providing real-time billing information to mobile subscribers that resides totally in the PLMN. Finally, special subscriber terminals, modified with smartcard readers, must be utilized to access the stored information in the SCPs through a subscriber management system. The information is not accessible by a subscriber with an ordinary, unmodified mobile telephone.

Review of each of the foregoing references reveals no disclosure or suggestion of a system or method such as that described and claimed herein.

In order to overcome the disadvantage of existing solutions, it would be advantageous to have a real-time billing system that utilizes intersystem signaling messages to track a call through a plurality of MSCs. Such a system would immediately provide toll ticketing records for one or more mobile subscribers involved in the call. No modifications to subscriber mobile stations would be required. It would also be advantageous to have a method of providing such real-time billing information from a system implemented totally in the Public Land Mobile Network (PLMN). The present invention provides such a system and method.

SUMMARY OF THE INVENTION

In one aspect, the present invention is a system for providing real-time billing (RTB) information to mobile subscribers operating mobile stations in a radio telecommunications network and involved in a call in which at least one of the mobile subscribers is a RTB subscriber. The system is implemented entirely within the network and without modifying the mobile stations. The system comprises a plurality of mobile switching centers (MSCs), each of which includes means for collecting toll ticketing (TT) records associated with calls processed by the MSC, means for associating the collected TT records with individual ones of the calls processed by the MSC, means for tagging collected TT records that are associated with real-time billing calls, and a port for sending the tagged TT records for immediate processing. The system also includes a local post processing unit including means for receiving the tagged TT records from the MSCs, a computer for immediately processing the received tagged TT records and computing real-time billing information, and means for electronically sending the computed real-time billing information to the RTB subscribers immediately after the completion of the call.

In another aspect, the present invention is a method within a radio telecommunications network of providing real-time billing (RTB) information to mobile subscribers operating mobile stations, the mobile subscribers being involved in a real-time billing (RTB) call in which at least one of the mobile subscribers is a RTB subscriber. The telecommunications network has a plurality of mobile switching centers (MSCs), and the method provides real-time billing (RTB) information without modifying the mobile stations. The method comprises the steps of collecting, within each of the plurality of MSCs, toll ticketing (TT) records associated with calls processed by each respective MSC; associating, within each of the plurality of MSCs, the collected TT records with individual ones of the calls processed by each respective MSC; tagging, within each of the plurality of MSCs, collected TT records that are associated with the RTB call; sending the tagged TT records to a local post processing unit for immediate processing, immediately processing the received tagged TT records and computing real-time billing information; and electronically sending the computed real-time billing information to the RTB subscribers immediately after the completion of the RTB call.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The present invention is a real-time billing (RTB) system that utilizes intersystem signaling messages to track a call through a plurality of MSCs, and immediately provide toll ticketing records for one or more mobile subscribers involved in the call. For subscribers who subscribe to the real-time billing service (RTB subscribers), the present invention computes the actual charges accrued by each RTB subscriber involved in the call in real time. Each RTB subscriber is provided with a readout of the charges for each call immediately after each call is completed. The cost information may be displayed to the subscriber on the digital display on the telephone, or the information may be printed on a local printer. The real-time billing service supports all types of subscribers, manual (if the subscriber is connected in the home location register (HLR) of the visited MSC), automatic, and non-resident subscribers. A new subscriber category is defined in the HLR for RTB subscribers, and is passed to MSCs serviced by the HLR in all appropriate messages.

The RTB system is implemented entirely within the mobile telecommunications network, and does not require any modification of existing mobile telephones. The real-time billing service is available for all mobile traffic scenarios including but not limited to calls to and from the PSTN, all scenarios involving roaming between exchanges, call transfers including multiple call transfers between exchanges, calls involving multi-exchange paging, and roamer port calls with all transfer scenarios.

Figure 1:
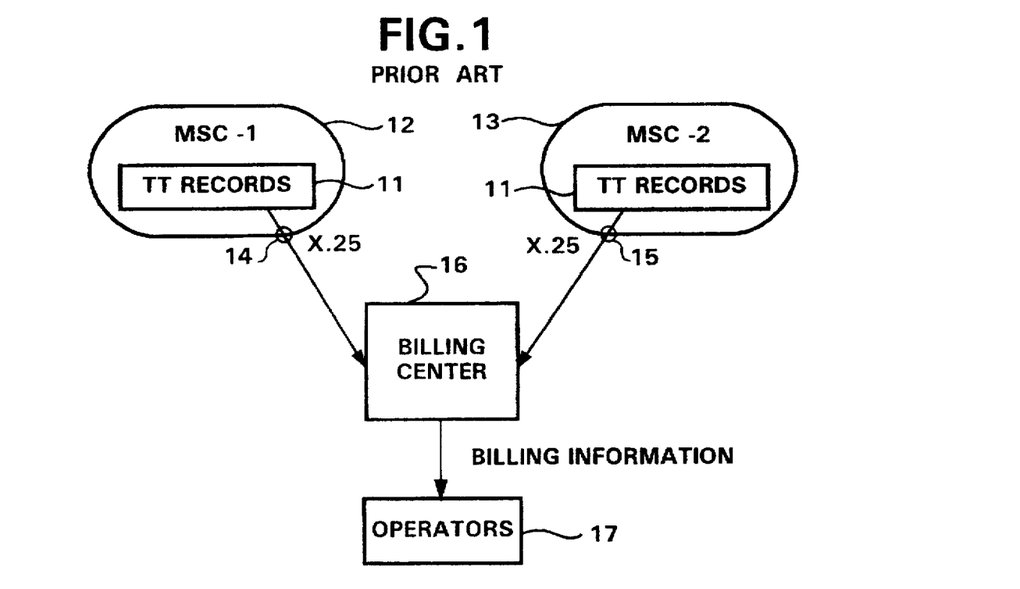
FIG. 1 (Prior Art) is a simplified block diagram illustrating the existing system for collecting toll ticketing (TT) records in radio telecommunications networks.

FIG. 1 is a simplified block diagram illustrating the existing system for collecting toll ticketing (TT) records 11 in radio telecommunications networks. A call may span several mobile switching centers (MSCs), and in FIG. 1, it is assumed that a call has spanned MSC-1 12 and MSC-2 13. TT records 11 are generated in each MSC. The MSCs correlate which TT records are associated with each subscriber through the use of billing ID numbers. The TT records from each MSC are stored on a hard disk memory device for that MSC and are also transferred via X.25 ports 14 and 15 to an external billing center 16 for post processing. Once in the billing center, the TT records are processed in non-real time, and billing information is generated and sent to respective operators 17. The billing information is then utilized to settle accounts between operators for automatic roaming services and to bill individual subscribers.

Figure 2:
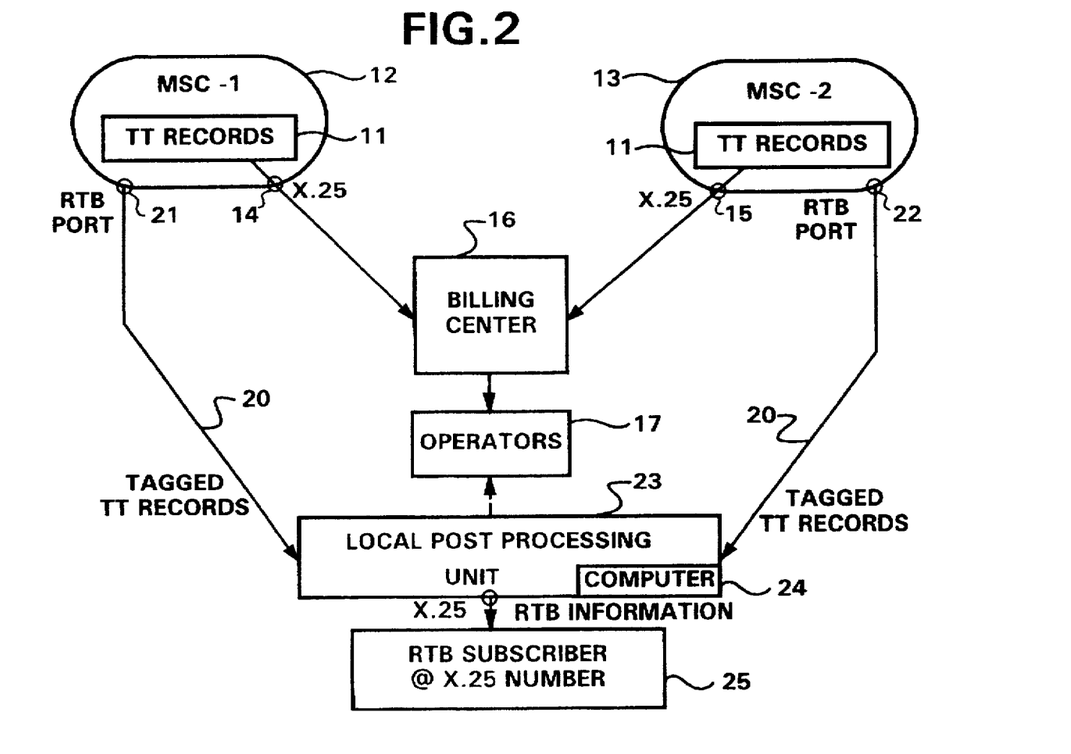
FIG. 2 is a simplified block diagram illustrating modifications made to the system for collecting toll ticketing (TT) records of FIG. 1 according to the teachings of the present invention.

FIG. 2 is a simplified block diagram illustrating modifications made to the system for collecting toll ticketing (TT) records of FIG. 1 according to the teachings of the present invention. The non-real-time reporting of TT records is performed the same as described in connection with FIG. 1, and all TT records are sent to the billing center 16 in the normal manner. However, TT records associated with RTB calls are also sent to a local post processing unit 23. MSC-1 12 and MSC-2 13 have been modified to recognize TT records tagged as being associated with RTB calls (tagged TT records) 20. Dedicated RTB ports 21 and 22 are added to MSC-1 and MSC-2 respectively, and as soon as a call involving one or more RTB subscribers is completed, each MSC involved in the call passes tagged TT records to the local post processing unit 23. TT records are tagged in a new field introduced in the TT records to support the RTB service. The tagged TT records include the following:

All TT records generated during the RTB call and of any chargeable duration;

All TT records that are in the call path after call delivery (during speech); and All interexchange handoff TT records generated in the anchor MSC.

The local post processing unit includes a post processing computer 24 where the charges are computed. The charges are sent to any RTB subscriber 25 requesting his charges.

The charges may be sent to the RTB subscriber through an X.25 port to an X.25 number which is added to the RTB subscriber's profile stored in the subscriber's home location register (HLR) (not shown). In other embodiments, the charges may be delivered by other means such as via a short message service (SMS) message center and the air interface control channel to the display of the RTB subscriber's mobile station.

Both calling and called subscribers may incur charges in the course of placing, receiving, and forwarding cellular telephone calls. The present invention computes the charges for all RTB subscribers involved in each RTB call and immediately provides the billing information to those subscribers who request their charges at the completion of the call.

The RTB system recognizes a call as a RTB call whenever one subscriber involved in the call has a subscription to the real-time billing service. Therefore, any one of the following calls is a RTB call:

The originating subscriber (i.e., A subscriber) is a RTB subscriber;

The terminating (receiving) subscriber (i.e., B subscriber) is a RTB subscriber;

A subscriber to which the call is transferred (i.e., C subscriber) is a RTB subscriber; or Any combination of the above.

In a call in which mobile station A (MS-A) calls mobile station B (MS-B), the MSCs involved in the call may generate TT1 for MS-A and TT2 for MS-B. If subscriber A subscribes to real-time billing, then TT1 is "tagged" so that the information is pulled from the TT records received on all other subscribers in the MSC. It is then immediately sent to the local post processing unit 23. Likewise, TT2 is pulled and sent to the local post processing unit so that the entire billing structure for the call can be ascertained. The process is more complex when call transfers are involved, but the RTB system of the present invention tags each TT record associated with the call and provides it in real time to the local post processing unit 23.

RTB information sent to the subscriber may be considered as an information service rather than a formal invoice requiring payment. In this case, the RTB information must also be supplied to the operator so that the RTB information may be included in the operator's next invoice. If the tagged TT records are "pulled" from the TT records in the MSC, and not reported to the normal billing center 16, then the RTB information must be sent from the local post processing unit 23 to the operator 17 as well as to the RTB subscribers. However, if the tagged TT records are "copied" from the TT records in the MSC, and are therefore sent from the MSC to both the billing center 16 and the local post processing unit 23, then the RTB information must be sent only to the RTB subscribers.

In order to follow a call through a plurality of MSCs, and gather TT records from each MSC involved in the call, modifications are made to intersystem signaling messages. In the preferred embodiment of the present invention, the IS-41 intersystem signaling protocol is utilized. IS-41 is hereby incorporated by reference in its entirety herein.

The IS-41 message modifications involve the addition of a new/private data element to selected IS-41 messages depending upon the particular call scenario. However, regardless of the call scenario, three IS-41 messages must be modified to include an indication that the call is a RTB call. These three messages are the Registration Notification Return Result (RegNot RR) message, the Qualification Request Return Result (QualReq RR) message, and the Qualification Directive Invoke (QualDir Inv) message.

Figure 3:
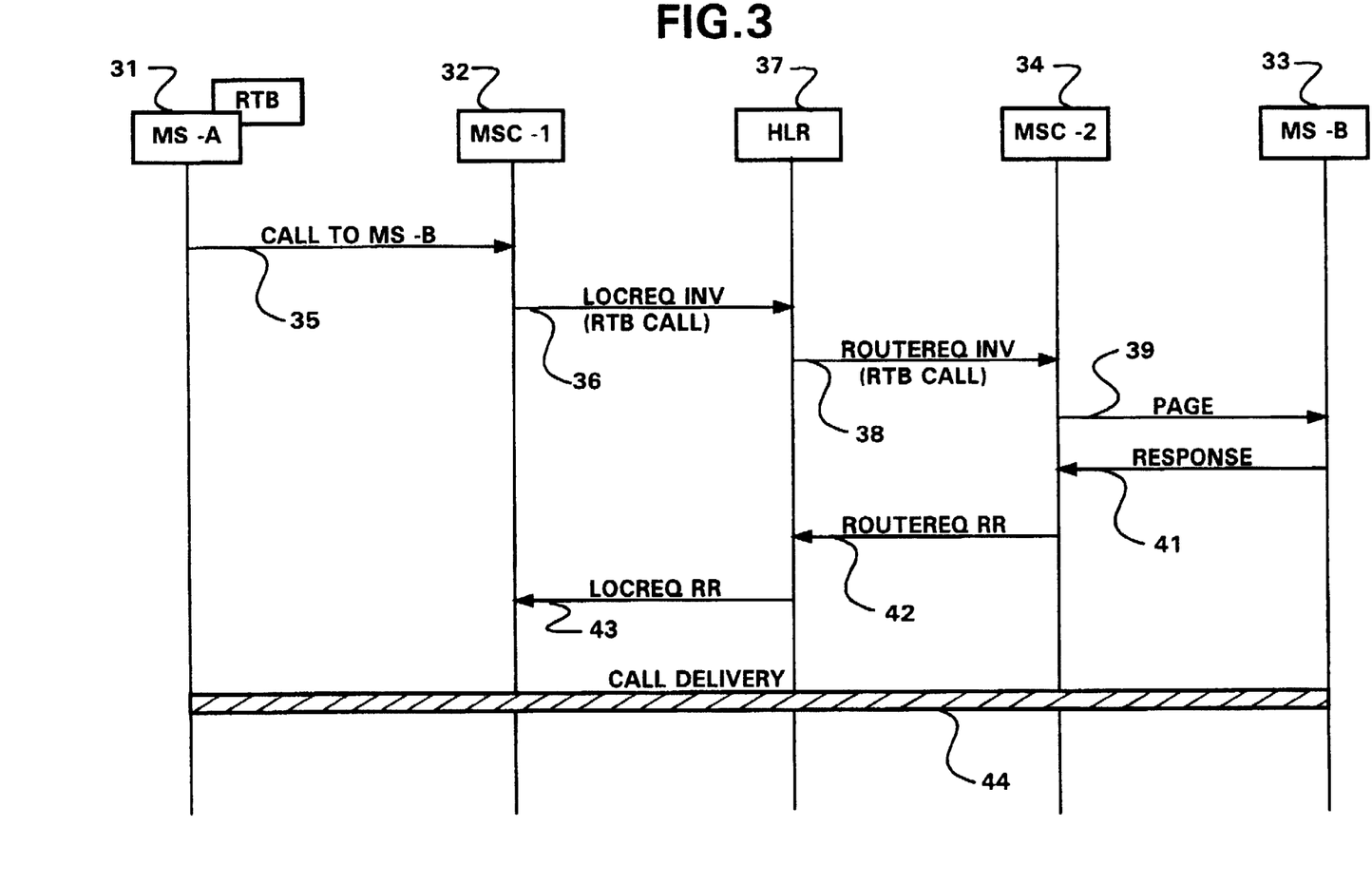
FIG. 3 is a message flow diagram illustrating the IS-41 signaling messages involved in placing a call from an originating RTB subscriber in a first MSC to a terminating non-RTB subscriber in a second MSC.

FIG. 3 is a message flow diagram illustrating the IS-41 signaling messages involved in placing a call from an originating RTB subscriber (MS-A) 31 in a first MSC (MSC-1) 32 to a terminating non-RTB subscriber (MS-B) 33 in a second MSC (MSC-2) 34. For simplicity, the message flow diagrams utilized herein do not illustrate radio base stations between each MSC and the mobile stations operating in each MSC's respective coverage area since the base stations do not affect the network signaling relavent to the present invention. However, it is understood that such base stations exist and provide the radio interface link between the MSCs and the mobile stations. At 35, MS-A places the call to MS-B. The MSC-1 sends a Location Request Invoke (LocReq Inv) message 36 to its home location register (HLR) 37. The LocReq Inv message 36 includes an indication that MS-A is a RTB subscriber, and therefore, the call is a RTB call. The HLR 37 sends a Routing Request Invoke (RouteReq Inv) message 38 to MSC-2. The RouteReq Inv message identifies the call as a RTB call. This alerts MSC-2 to send the associated TT records to the local post processing unit 23 (FIG. 2) immediately upon call completion.

The remainder of the call setup process is standard in accordance with IS-41. Following a page 39 and a response 41 from MS-B, MSC-2 returns a Routing Request Return Result (RouteReq RR) message 42 to the HLR 37. The HLR then sends a Location Request Return Result (LocReq RR) message 43 to MSC-1. Thereafter, call delivery is completed at 44.

Figure 4:
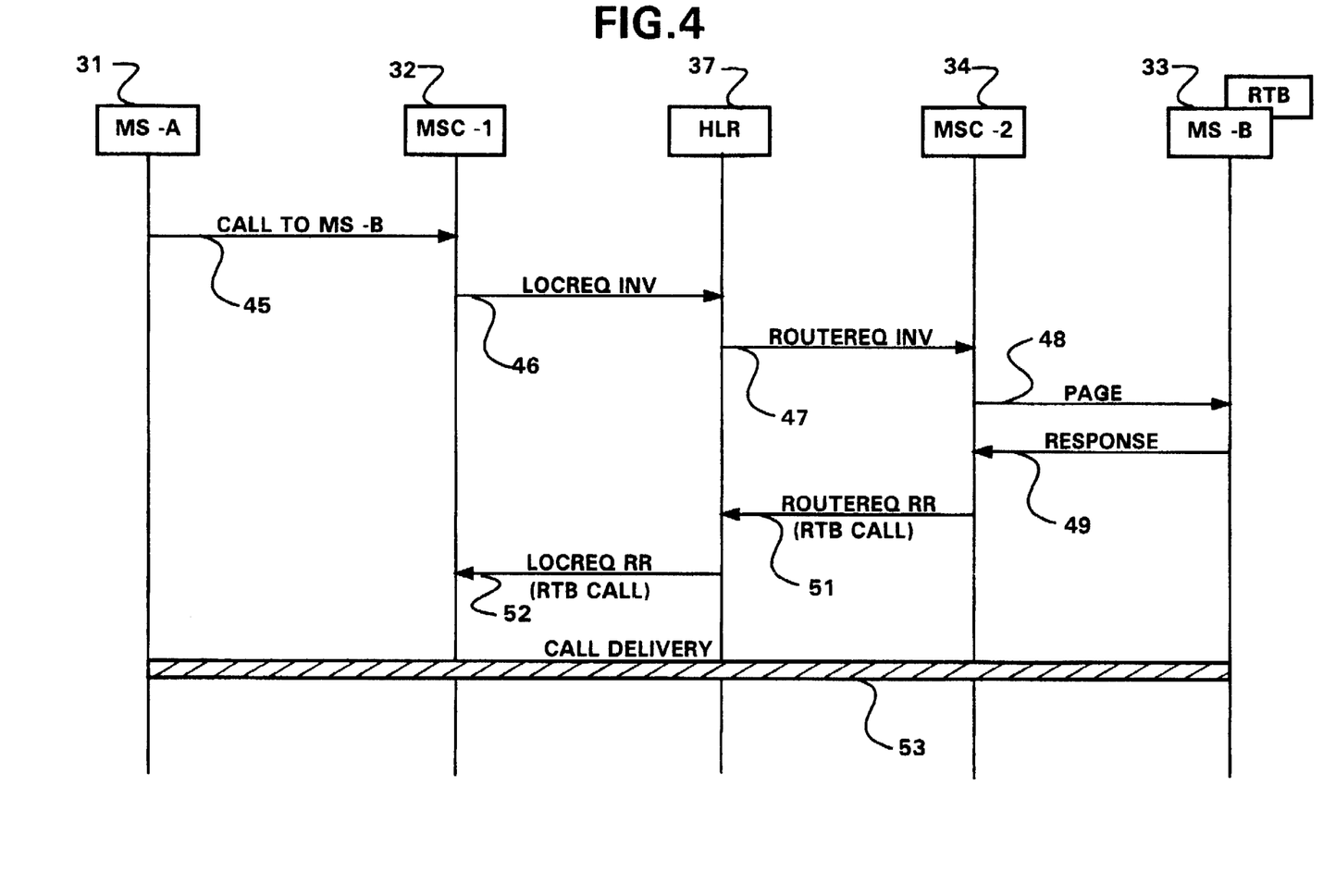
FIG. 4 is a message flow diagram illustrating the IS-41 signaling messages involved in placing a call from an originating non-RTB subscriber in a first MSC to a terminating RTB subscriber in a second MSC.

FIG. 4 is a message flow diagram illustrating the IS-41 signaling messages involved in placing a call from an originating non-RTB subscriber (MS-A) 31 in a first MSC (MSC-1) 32 to a terminating RTB subscriber (MS-B) 33 in a second MSC (MSC-2) 34. The MS-A places the call to MS-B at 45. The MSC-1 sends a standard Location Request Invoke (LocReq Inv) message 46 to its home location register (HLR) 37. The HLR 37 sends a standard Routing Request Invoke (RouteReq Inv) message 47 to MSC-2.

Following a page 48 and a response 49 from MS-B, MSC-2 returns a Routing Request Return Result (RouteReq RR) message 51 to the HLR 37. The RouteReq RR message includes an indication that MS-B is a RTB subscriber, and therefore, the call is a RTB call. The HLR then sends a Location Request Return Result (LocReq RR) message 52 to MSC-1. The LocReq RR message 52 identifies the call as a RTB call. This alerts MSC-1 to send the associated TT records to the local post processing unit 23 (FIG. 2) immediately upon call completion. Thereafter, call delivery is completed at 53.

Figure 5:
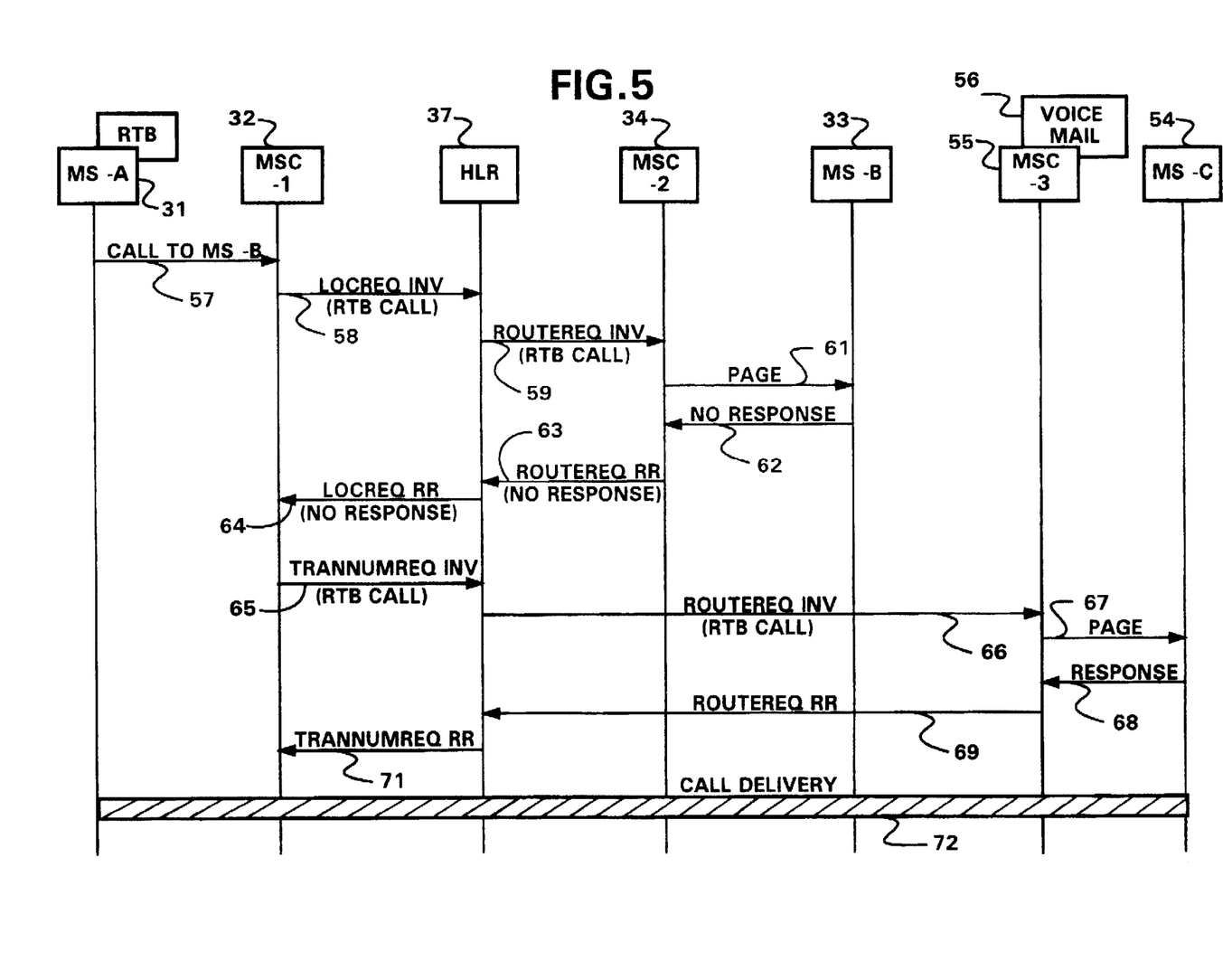
FIG. 5 is a message flow diagram illustrating the IS-41 signaling messages involved in a call transfer sequence from an originating RTB subscriber in a first MSC to a non-RTB called subscriber in a second MSC, where the call is transferred to a non-RTB terminating subscriber in a third MSC.

FIG. 5 is a message flow diagram illustrating the IS-41 signaling messages involved in a call transfer sequence from an originating RTB subscriber (MS-A) 31 to a non-RTB called subscriber (MS-B) in MSC-2, where the call is transferred to a non-RTB terminating subscriber (MS-C) 54 in MSC-3. In FIG. 5, a call to non-RTB subscriber (MS-B) 33 in MSC-2 is transferred to another non-RTB subscriber (MS-C) 54 in a third MSC (MSC-3) 55. MSC-3 is also shown to have a voice mail machine 56.

The message flow begins at 57 where MS-A places the call to MS-B. The MSC-1 sends a Location Request Invoke (LocReq Inv) message 58 to its home location register (HLR) 37. The LocReq Inv message 58 includes an indication that MS-A is a RTB subscriber, and therefore, the call is a RTB call. The HLR 37 sends a Routing Request Invoke (RouteReq Inv) message 59 to MSC-2. The RouteReq Inv message identifies the call as a RTB call. This alerts MSC-2 to send the associated TT records to the local post processing unit 23 (FIG. 2) immediately upon call completion.

Following a page 61, MSC-2 may receive, for example, no response 62 or a busy signal. MSC-2 returns a Routing Request Return Result (RouteReq RR) message 63 to the HLR 37 indicating the no response condition. The HLR then sends a Location Request Return Result (LocReq RR) message 64 to MSC-1 indicating the no response condition. MSC-1 then sends a Transfer-to-Number Request Invoke (TranNumReq Inv) message 65 to the HLR 37 and includes an indication that the call is a RTB call. The HLR then sends a RouteReq Inv message 66 to MSC-3 and identifies the call as an RTB call. Following a page 67 and a response 68 from MS-B, MSC-2 returns a Routing Request Return Result (RouteReq RR) message 69 to the HLR 37. The HLR then sends a TranNumReq Return Result message 71 to MSC-1. Thereafter, call delivery is completed at 72. If no page response is received from the MSC 54 at step 68, MSC-3 may forward the call to the voice mail machine 56. Toll ticketing records reported by MSC-3 may include a charge for this service for the applicable subscriber.

For transfers to voice mail, TT records are generated in a peripheral equipment gateway (PEG) in MSC-3. Services through the following voice mail categories are tagged if any of the parties to the call are RTB subscribers:

Transfer to Voice Mail on Busy (VMB);

Transfer to Voice Mail on No Reply (VMN); and

Immediate Transfer to Voice Mail (VMT).

Although not shown in FIG. 5, other combinations of RTB subscribers and non-RTB subscribers in the various MSCs are possible, and are handled by the RTB system of the present invention. For example, if MS-A is a non-RTB subscriber, and MS-B is a RTB subscriber, then the following changes are made to the IS-41 signaling messages of FIG. 5. The LocReq Inv message 58 and the RouteReq Inv message 59 are standard messages. However, the RouteReq RR message 63 and the LocReq RR message 64 include an indication that MS-B is a RTB subscriber, and therefore, the call is a RTB call. This alerts MSC-1 to send the associated TT records to the local post processing unit 23 (FIG. 2) immediately upon call completion. In addition, MSC-1 thereafter includes an RTB indication in the TranNumReq Inv message 65. The remainder of the signaling messages are as shown in FIG. 5.

If MS-A and MS-B are non-RTB subscribers, and MS-C is a RTB subscriber, then the following changes are made to the IS-41 signaling messages of FIG. 5. All of the signaling messages through the page message 67 are standard IS-41 messages. Following the response 68 from RTB subscriber MS-C, MSC-3 includes an indication that the call is a RTB call in the RouteReq RR message 69. The HLR 37 also includes the RTB indication in the TranNumReq RR message 71 sent to the MSC-1. This alerts MSC-1 to send the associated TT records to the local post processing unit 23 (FIG. 2) immediately upon call completion. In this particular scenario, it is not necessary to notify MSC-2 of the RTB call.

No billing information is generated in MSC-2 since no call was connected for any chargeable time duration.

Figure 6:
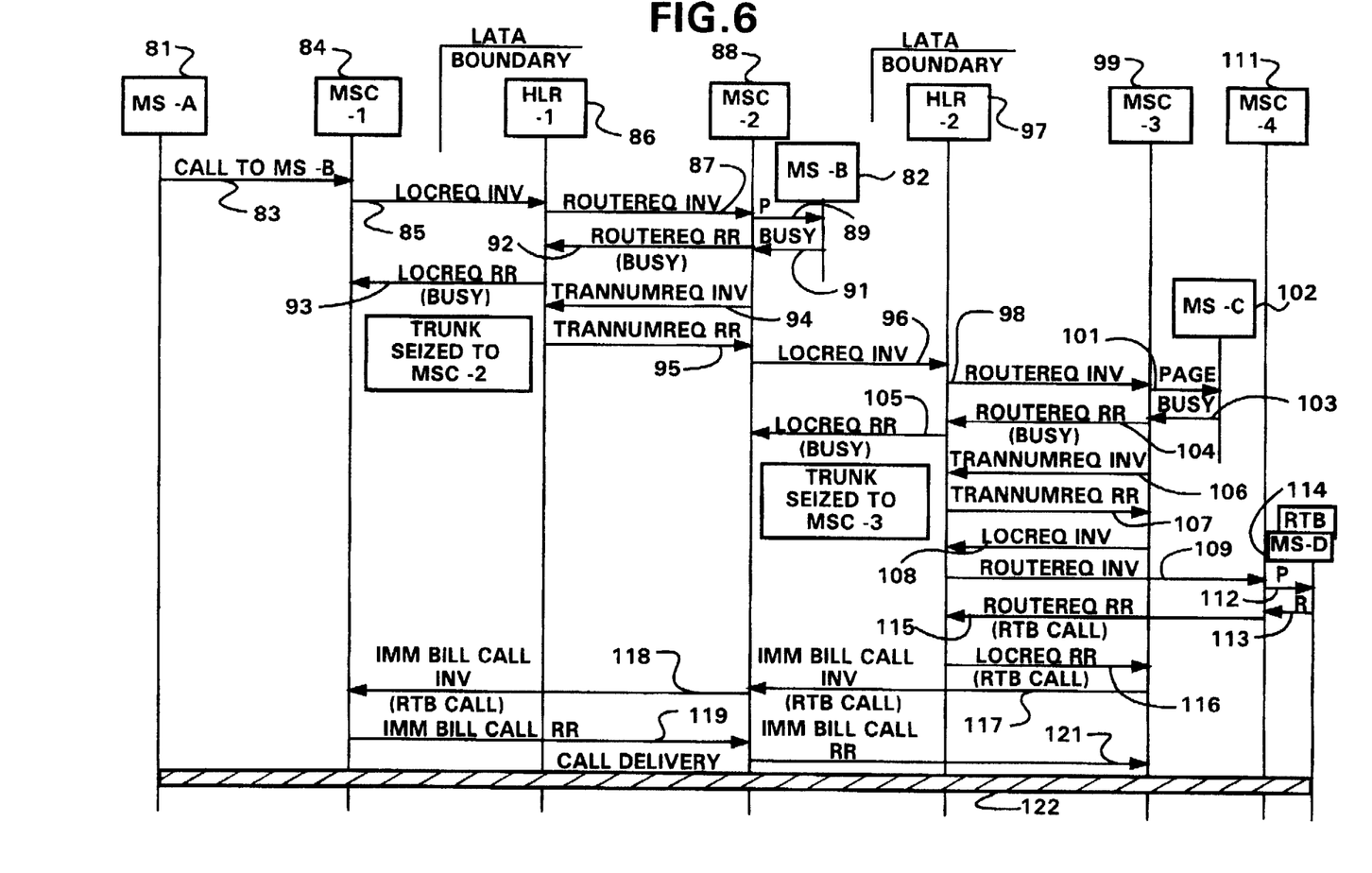
FIG. 6 is a message flow diagram illustrating the IS-41 signaling messages involved in a call transfer sequence from an originating non-RTB subscriber in a first MSC via multiple non-RTB subscribers in other MSCs to a terminating RTB subscriber in a fourth MSC.

FIG. 6 is a message flow diagram illustrating the IS-41 signaling messages involved in a call transfer sequence from an originating non-RTB subscriber (MS-A) in MSC-1 via multiple non-RTB subscribers (MS-B in MSC-2, and MS-C in MSC-3) to a terminating RTB subscriber (MS-D) in MSC-4. MSC-1 and MSC-2 are in different Local Access and Transport Areas (LATAs), and MSC-2 and MSC-3 are in different LATAs. In the type of call scenario illustrated in FIG. 6, the present invention utilizes a new IS-41 message called an "Immediate Billing Call Invoke (ImmBillCall Inv) message to notify other MSCs in the call transfer sequence that the call is a RTB call. Whenever a MSC receives a RTB call indication in an IS-41 message, the MSC receiving the RTB indication determines whether or not the RTB indication was received from the same MSC from which the call was received. In addition, the MSC receiving the RTB indication determines whether or not it was, itself, the originating MSC. If the RTB indication was received from a different MSC than the MSC from which the call was received, and if the MSC receiving the RTB indication was not the originating MSC, then the MSC receiving the RTB indication sends an ImmBillCall Inv message to the MSC from which it received the call. In this manner, each MSC in the call transfer sequence is notified that the call is a RTB call, and that the notified MSC should send the associated TT records to the local post processing unit 23 (FIG. 2) immediately upon call completion.

In FIG. 6, MS-A 81 makes a call to MS-B 82 at 83. MSC-1 84 sends a standard Location Request Invoke (LocReq Inv) message 85 to HLR-1 86. The HLR-1 86 sends a standard Routing Request Invoke (RouteReq Inv) message 87 to MSC-2 88. Following a page 89 to MS-B 82, MSC-2 may receive, for example, a busy signal 91. MSC-2 returns a standard Routing Request Return Result (RouteReq RR) message 92 to HLR-1 86 indicating the busy condition. The HLR-1 then sends a standard Location Request Return Result (LocReq RR) message 93 to MSC-1 indicating the busy condition. At that point, because of the LATA boundary between MSC-1 84 and MSC-2 88, a trunk is seized to MSC-2 so that the transfer can occur at MSC-2.

A call transfer sequence is then begun, and since MSC-2 is in a different LATA than MSC-1, the sequence is begun by MSC-2 88 which sends a standard TranNumReq Inv message 94 to HLR-1. HLR-1 then sends a standard TranNumReq RR message 95 back to MSC-2 which, in turn, sends a standard LocReq Inv message 96 to HLR-2 97. The HLR-2 97 sends a standard Routing Request Invoke (RouteReq Inv) message 98 to MSC-3 99. Following a page 101 to MS-C 102, MSC-3 may receive a signal 103 indicating that MS-C is unavailable, for example, a signal indicating a busy condition. MSC-3 returns a standard Routing Request Return Result (RouteReq RR) message 104 to HLR-2 97 indicating the busy condition. HLR-2 then sends a standard Location Request Return Result (LocReq RR) message 105 to MSC-2 indicating the busy condition. At that point, because of the LATA boundary between MSC-2 88 and MSC-3 99, a trunk is seized to MSC-3 so that the transfer can occur at MSC-3.

Another call transfer sequence is then begun, and since MSC-3 is in a different LATA than MSC-2, the sequence is begun by MSC-3 99 which sends a standard TranNumReq Inv message 106 to HLR-2. HLR-2 then sends a standard TranNumReq RR message 107 back to MSC-3 which, in turn, sends a standard LocReq Inv message 108 to HLR-2 97. HLR-2 then sends a standard Routing Request Invoke (RouteReq Inv) message 109 to MSC-4 111.

Following a page 112 and a response 113 from RTB subscriber MS-D 114, MSC-4 returns a Routing Request Return Result (RouteReq RR) message 115 to HLR-2 97. The RouteReq RR message includes an indication that MS-D is a RTB subscriber, and therefore, the call is a RTB call. HLR-2 then sends a Location Request Return Result (LocReq RR) message 116 to MSC-3 with an indication that the call is a RTB call.

At this point, MSC-3 has received its first indication that the call is a RTB call. Therefore, MSC-3 determines whether or not the RTB indication was received from the same MSC from which the call was received (i.e., whether it was received from MSC-2). In addition, MSC-3 determines whether or not MSC-3 was the originating MSC. In this scenario, the RTB indication was received from MSC-4, and the call was received from MSC-2. In addition, MSC-3 was not the originating MSC. Therefore, MSC-3 sends an ImmBillCall Inv message 117 to MSC-2 (i.e., the MSC from which it received the call) with an indication that the call is a RTB call.

At this point, MSC-2 has received its first indication that the call is a RTB call. Therefore, MSC-2 performs the same analysis as performed by MSC-3 and sends an ImmBillCall Inv message 118 to MSC-1 (i.e., the MSC from which it received the call) with an indication that the call is a RTB call. MSC-1 has now received its first indication that the call is a RTB call, and it performs the performs the same analysis as performed by MSC-3 and MSC-2. However, since MSC-1 is the originating MSC, it does not forward the ImmBillCall Inv message any further, but returns an ImmBillCall RR message 119 to MSC-2. MSC-2, in turn, sends an ImmBillCall RR message 121 to MSC-3. Thereafter, call delivery is completed at 122. Each MSC in the call transfer sequence is notified that the call is a RTB call, and therefore sends the associated TT records to the local post processing unit 23 (FIG. 2) immediately upon call completion.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A system for providing real-time billing (RTB) information to mobile subscribers operating mobile stations in a radio telecommunications network, said mobile subscribers being involved in a call in which at least one of said mobile subscribers is a RTB subscriber, and said system being implemented entirely within said network and without modifying said mobile stations, said system comprising:

a plurality of mobile switching centers (MSCs), each of said MSCs including:
means for collecting toll ticketing (TT) records associated with calls processed by said MSC;
means for associating said collected TT records with individual ones of said calls processed by said MSC;
means for tagging TT records that are associated with real-time billing calls that are conducted in each of a plurality of cells within said MSC's service area; and
a port for sending said tagged TT records for immediate processing; and a local post processing unit including:
means for receiving said tagged TT records from said MSCs;
a computer for immediately processing said received tagged TT records and computing real-time billing information; and means for electronically and automatically sending said computed real-time billing information to said RTB subscribers, without modifying said mobile stations, immediately after the completion of said call.

2. Within a radio telecommunications network, a method of providing real-time billing (RTB) information to mobile subscribers operating mobile stations, said mobile subscribers being involved in a real-time billing (RTB) call in which at least one of said mobile subscribers is a RTB subscriber, said telecommunications network having a plurality of mobile switching centers (MSCs), and said method providing real-time billing (RTB) information without modifying said mobile stations, said method comprising the steps of:

collecting, within each of said plurality of MSCs, toll ticketing (TT) records associated with calls processed by each respective MSC;

associating, within each of said plurality of MSCs, said collected TT records with individual ones of said calls processed by each respective MSC;

tagging, within each of said plurality of MSCs, collected TT records that are associated with said RTB call;

sending said tagged TT records to a local post processing unit for immediate processing;

immediately processing said received tagged TT records and computing real-time billing information; and     electronically and automatically sending said computed real-time billing information to said RTB subscribers, without modifying said mobile stations, immediately after the completion of said RTB call.

3. The method of providing real-time billing (RTB) information of claim 2 further comprising, before the step of tagging TT records associated with said RTB call, the step of notifying each of said MSCs when one of said calls processed by one of said MSCs is a RTB call.

4. The method of providing real-time billing (RTB) information of claim 3 wherein said step of notifying each of said MSCs when one of said calls processed by one of said MSCs is a RTB call includes inserting a new/private data element in standard intersystem signaling messages identifying a call being processed by said MSC as a RTB call.

5. The method of providing real-time billing (RTB) information of claim 4 wherein said step of inserting a new/private data element in standard intersystem signaling messages includes inserting a new/private data element in IS-41 intersystem signaling messages identifying a call being processed by said MSC as a RTB call.

6. Within a radio telecommunications network, a method of providing real-time billing (RTB) information to mobile subscribers operating mobile stations, said mobile subscribers being involved in a real-time billing (RTB) call in which at least one of said mobile subscribers is a RTB subscriber, said telecommunications network having a plurality of mobile switching centers (MSCs), and said method providing said RTB information without modifying said mobile stations, said method comprising the steps of:

collecting, within each of said plurality of MSCs, toll ticketing (TT) records associated with calls processed by each respective MSC;

associating, within each of said plurality of MSCs, said collected TT records with individual ones of said calls processed by each respective MSC;

notifying each of said MSCs when one of said calls processed by one of said MSCs is a RTB call, said notifying step including the steps of:

inserting a new/private data element in IS-41 intersystem signaling messages identifying a call being processed by said MSC as a RTB call;

receiving, in one of said MSCs, said new/private data element in an IS-41 intersystem signaling message;

determining, in said one of said MSCs, whether said IS-41 intersystem signaling message with said new/private data element was received from the MSC from which said RTB call was received;

determining, upon determining that said IS-41 intersystem signaling message with said new/private data element was not received from the MSC from which said RTB call was received, whether said one of said MSCs originated said RTB call; and         sending, upon determining that said one of said MSCs did not originate said RTB call, an Immediate Billing Call message from said one of said MSCs to the MSC from which said RTB call was received;

tagging, within each of said plurality of MSCs, collected TT records that are associated with said RTB call;

sending said tagged TT records to a local post processing unit for immediate processing;

immediately processing said received tagged TT records and computing real-time billing information; and     electronically sending said computed real-time billing information to said RTB subscribers immediately after the completion of said RTB call.

7. The method of providing real-time billing (RTB) information of claim 6 wherein said step of tagging, within each of said plurality of MSCs, collected TT records that are associated with said RTB call includes introducing a new field in the TT records to support real-time billing.

8. The method of providing real-time billing (RTB) information of claim 7 further comprising the step of sending untagged TT records to a billing center for non-real time processing.

9. The method of providing real-time billing (RTB) information of claim 8 further comprising, after the step of electronically sending said computed real-time billing information to said RTB subscribers, the step of sending said computed real-time billing information to said billing center.

10. The method of providing real-time billing (RTB) information of claim 7 further comprising, after the step of sending said tagged TT records to a local post processing unit for immediate processing, the step of sending said collected TT records to a billing center for non-real time processing.

11. Within a radio telecommunications network, a method of automatically providing real-time billing (RTB) information to a RTB mobile subscriber operating a mobile station, said RTB mobile subscriber being involved in a RTB call which is handled by a plurality of mobile switching centers (MSCs), and said method providing said RTB information to said RTB subscriber without modifying said mobile station, said method comprising the steps of:

collecting, within each of said plurality of MSCs, toll ticketing (TT) records associated with said RTB call;

sending said TT records associated with said RTB call to a local post processing unit for immediate processing at the end of said RTB call;

immediately processing said TT records upon receipt at said local post processing unit and computing real-time billing information; and     electronically and automatically sending said computed real-time billing information to said RTB subscriber, without modifying said mobile station, immediately after the completion of said RTB call.

\* \* \* \* \*